Patented Feb. 8, 1966

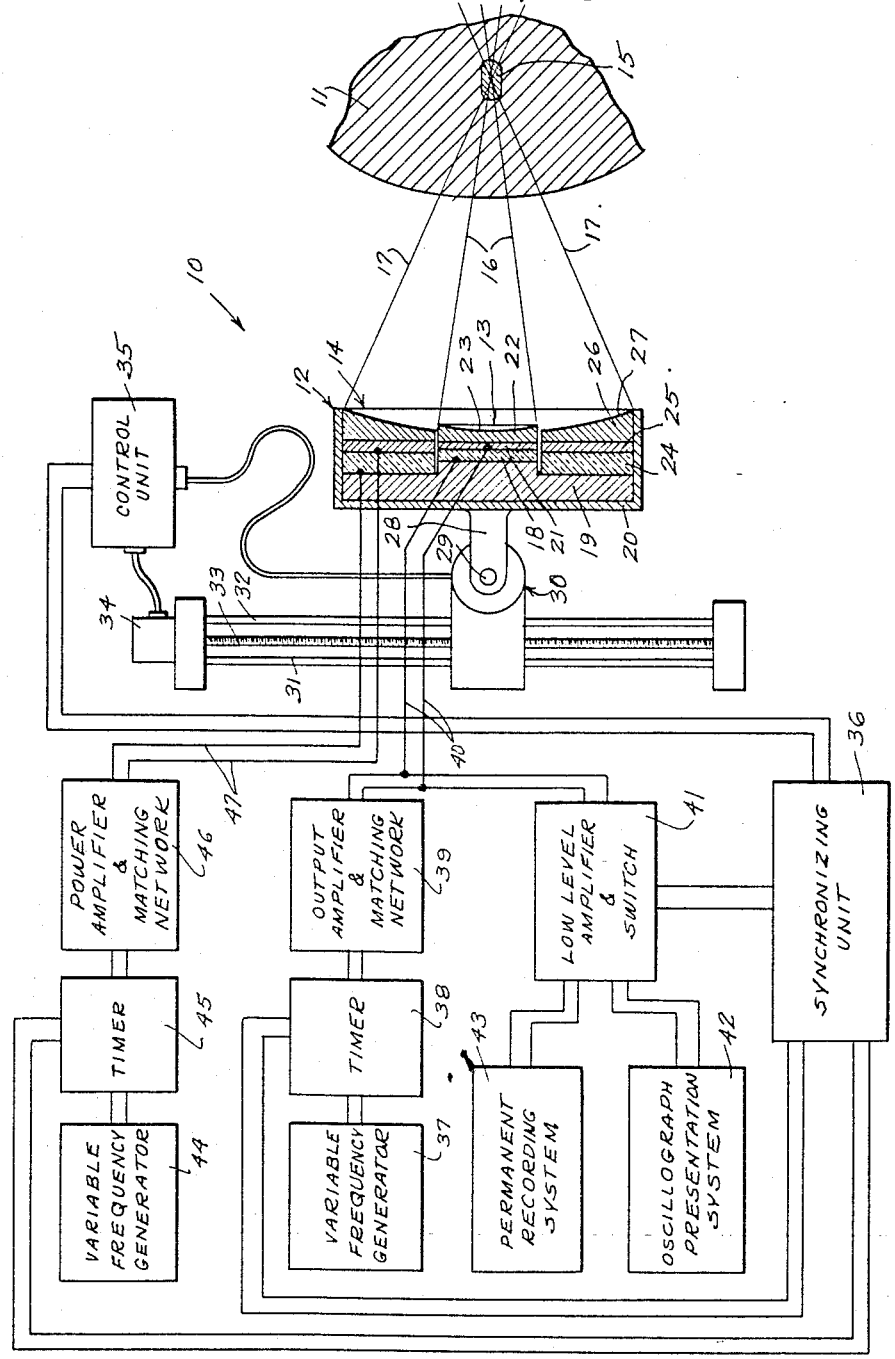

3,233,450
ACOUSTIC FLAW DETECTION SYSTEM
William J. Fry, 68 Greencroft, Champaign, Ill.
Filed Nov. 8, 1961, Ser. No. 151,088
16 Claims. (Cl. 73—67.8)

This invention relates to a system using acoustic energy for detection of internal inhomogeneities such as flaws, cracks, stress concentrations or the like in metal, plastic or glass parts or the like or internal changes or boundaries in any body or structure whether of a solid or semi-solid character. The system of this invention can detect inhomogeneities which cannot be detected by any system of the prior art. It may be used, for example, in detecting a boundary between the gray and white matter of the brain, in detecting otherwise undetectable strains in metal, and in examining aircraft parts or the like for fatigue.

The detection of inhomogeneities in materials and structures by acoustic methods based on the principles of reflection of a portion of the incident acoustic energy from the region of the inhomogeneity has received extensive application. Methods based on the interruption or restriction of transmission of acoustic energy through such regions have also received attention. All of these methods employed up to the present time depend upon the inhomogeneity having enough difference in certain acoustic properties, for example density and sound velocity, from those of the medium in which the sound is incident or the surrounding medium, to reflect, or otherwise modify, sufficient incident acoustic energy to permit detection by suitably placed transducers or receivers. Consequently, inhomogeneities not characterized by sufficient changes in these acoustical characteristics to cause detectable modification of the incident acoustic energy are not revealed by the methods available up to the present time.

The object of the present invention is the detection of inhomogeneities which are not detected or which are inadequately revealed by present acoustic methods. The basic principle of the invention is the employment of acoustic energy to temporarily modify some of the acoustic characteristics of an inhomogeneity relative to the surrounding, embedding, or bordering medium to result in sufficient modification, for example reflection, of incident acoustic energy to be detected by appropriate transducers. Thus the invention employs acoustic energy in two distinctly different ways. First a change is induced in the material or structure undergoing examination and secondly, this change is detected by modification (reflection or other effect) of incident acoustic energy.

In order to induce a sufficiently large change in the appropriate acoustical properties in the region of an inhomogeneity of the medium it is necessary to adjust the level and duration of the incident acoustic energy, which produces the change, to produce for example a transient gradient in the temperature of sufficient magnitude. This can be accomplished since regions of different structure, flaws or stress concentrations are characterized in many cases by different values of the acoustical absorption coefficient even though they do not exhibit enough change in those acoustical properties important for reflection of incident acoustic energy so that they can be revealed by the acoustical methods available up to the time of the present invention. In addition, temperature gradients can be produced by acoustic energy at boundaries of media differing for example in thermal conductivity or viscosity characteristics. The temperature changes induced by the various mechanisms result in changes in the acoustic velocity, for example, and a gradient in velocity of sufficient magnitude reflects acoustic energy that can be detected.

According to an important feature of the invention, two focused ultrasonic beams are employed, one producing temporary changes in acoustical characteristics of the inhomogeneous structure and the other detecting gradients in the induced changes to thus identify flaws, boundaries between different structural types or other inhomogeneities.

This invention contemplates other and more specific objects, features and advantages which will become more fully apparent from the following detailed description taken in conjunction with the accompanying drawing in which the single figure illustrates a preferred embodiment of the invention.

Reference numeral 10 generally designates an acoustic inspection system constructed according to the principles of this invention, employing an ultrasonic beam to modify temporarily the acoustic impedance relations at inhomogeneities internal to a structure 11 while simultaneously examining the changes in impedances induced by using an examining beam. For most applications, the acoustic energy is in the form of higher frequency ultrasonic waves, but it will be understood that the invention is not necessarily limited thereto.

To produce the examining and modifying beams, a transducer assembly 12 is provided which consists of an inner examining beam unit 13 and an outer modifying beam unit 14 in concentric surrounding relation to the inner unit. The inner examining beam unit 13 is so constructed as to produce a focused beam which may converge at an inhomogeneous region 15 within the structure 11, the outer edges of the examining beam being indicated diagrammatically by the lines 16. The outer modifying beam unit 14 is so constructed as to produce a focused beam of annular cross-section which may also converge at the inhomogeneous region 15 within the structure 11, the outer edge of the modifying beam being indicated diagrammatically by the lines 17. If desired, the unit 13 may be employed for producing the modifying beam and the unit 14 for producing the examining beam such that the annular beam 17 will be the examining or inspecting beam. With one of these arrangements, overlapping of the examining and modifying beams is minimized, except at the region 15 where the focal areas thereof are coincident. This is very desirable in many cases since the modification by the modifying beam of acoustic characteristics along the path of the examining beam might confuse interpretation.

In practice, the heating effect of the modifying beam within the structure 11 is realized, not only at the focal point of the beam, but at adjacent points thereto. For all practical purposes, the modifying beam can be considered as having some width dimension at its focal point. If it is considered that the inhomogeneous region 15 changes in its inhomogeneity characteristics through a cross-section thereof, temperature and velocity gradients are induced within the inhomogeneous region 15. However, if the region 15 and the structure 11 are individually homogeneous, the characteristics will change at an interface separating the two regions 11, 15. In such a situation, the temperature and velocity gradient is set up at interfaces between the regions of different absorbent characteristics.

The inner examining beam unit 13 comprises a transducer element 18, preferably a plate of quartz adapted for thickness vibration in response to application of a varying electric field between the opposite faces thereof, and adapted to develop a varying electrical signal between the opposite faces thereof in response to thickness vibration thereof, such as produced by echoes. The rear face of the transducer element 18 is cemented on a backing member 19 within a housing 20. Acoustic energy is transmitted from the front face of the element 18 through a couplant 21 to a beam-forming plate 22 which has a concave front surface 23 to converge the acoustic energy into the examining beam.

The outer modifying beam unit 14 comprises a transducer element 24 which may preferably comprise an annular plate of quartz, or a plurality of plates arranged in an annular formation, adapted for thickness vibration in response to application of a varying electric field between the opposite faces thereof. The rear face of the element 24 is cemented on the backing member 19. Acoustic energy is transmited from the front face of the element 24 through a couplant 25 to an annular beam-forming plate 26 having a concave front surface 27 to converge the acoustic energy into the modifying beam.

The portion of the backing member behind the transducer element 24 and its coupling to the housing 20 are preferably designed to extract a minimum fraction of vibratory energy produced by the transducer element 24 which may operate at a relatively high power level. The couplant and beam-forming plates, especially the couplant 25 and the plate 26 of the modifying beam unit, may preferably be dimensioned to permit operation at high power levels. In particular, both may have a thickness on the order of one-quarter wavelength or an odd number of quarter-wavelengths at the operating frequency or at an intermediate frequency of a range of operating frequencies, and the beam-forming plate may have a high characteristic impedance while the couplant has a low characteristic impedance. It may here be noted that it is possible and in many cases desirable to use water or another liquid as a couplant between the transducer units 13 and 14 and the specimen 11, and a solid member of appropriate configuration may also be used having surfaces engaged with and complementary to the surfaces of the transducer units and the specimen.

To achieve the shortest pulse lengths in the examining beam, the portion of the backing 19 adjacent to transducer element 18 can be designed so that it accepts without reflection a considerable fraction of the energy radiated by the transducer element 18.

In order to more completely visualize internal structure or flaws in a specimen, the transducer 12 is mounted for both rotation and translational motion, so as to permit examination at various sites from a variety of directions. As diagrammatically illustrated, the housing 20 of the transducer assembly 12 has a rearward extension 28 fixed on a shaft 29 of a positioning device 30 which is electrically controlled to rotate the transducer assembly about the axis of the shaft 29. The positioning device 30 is mounted for movement along a pair of guide bars 31 and 32, its position being controlled by a lead screw 33 which is driven by a motor unit 34. The motor unit 34 and the positioning unit 30 are connected through cables to a control unit 35 which in turn is connected to a synchronizing unit 36 to control the positioning of the transducer unit in synchronism with the operation of energizing and indicating means.

The control arrangment is similar to the scanning systems conventionally employed in radar and similar systems. For example, in the oscillograph presentation system 42, the bearing and range of reflecting regions may be represented on a viewing screen as abscissa and ordinate, the assembly 12 being rotated back and forth about the axis of shaft 29 in synchronism with the horizontal back and forth movement of the scanning spot, and a uniform vertical movement or sweep at a much higher rate being given to the scanning spot in synchronism with the transmission of energy from the examining transducer 13. In place of or in addition to rotation of the assembly about the axis of shaft 29, the motor 34 may be operated to move the assembly back and forth in synchronism with the horizontal movement of the scanning spot.

Since the heating effect of the modifying beam is realized at adjacent areas to the focal point, the focal region of the modifying beam in the direction along the axis of the beam is sufficiently long so that interfaces and structural features distributed over a considerable range of depths would be heated simultaneously. This would eliminate the need for scanning of the modifying transducer toward and away from the object, except for placing the focus at a depth corresponding to the region to be examined. Depth scanning may be desirable in some cases, but for many applications it would not be needed except as indicated for general location of the focus in the appropriate region.

A pulse-echo system is preferably used in conjunction with the examining transducer uint 13, the transducer being periodically energized to send out a short burst or pulse of waves, and being operative after each burst or pulse to "listen" for the return of echoes produced by inhomogeneities in the path of the examining beam. To energize the transducer 13, a signal from a generator 37 is applied through a modulator or timer 38 to an output amplifier and matching network 39 which is connected through lines 40 to electrodes of the transducer element 18. Such electrodes may be in the form of thin sheets of foil cemented or deposited on the front and rear faces of the element 18.

The modulator or timer 38 is controlled from the synchronizing unit 36. When energized, it operates periodically as an electronic switch to apply a signal from the generator 37 to the output amplifier and matching network 39 which then applies a short burst or pulse to the transducer element 18. The frequency of generator 37 is preferably variable but for example a frequency of four megacycles may be used with a pulse length of 0.25 microsecond and a repetition rate of 1000 pulses per second. If desired, the transducer 18 may be energized by applying a high voltage short duration pulse directly thereto to cause vibration of the transducer element at its natural resonant frequency, in which case the signal generator 37 is not required.

Echoes received by the transducer 13 produce weak signals on the lines 40 which are applied to a low level amplifier unit 41. A switch may be incorporated in the unit 41 and connected to the synchronizing unit 36 to prevent direct application of high intensity signals to the input of the amplifier thereof from the output amplifier and matching network 39.

The output of the amplifier unit 41 is applied to an oscillograph presentation system 42 and is also applied to a permanent recording system 43, a synchronizing connection being provided between the oscillograph presentation system 42 and the permanent recording system 43.

To energize the modifying beam transducer 14, a signal is applied from a variable frequency generator 44 through a modulator or timer 45 to a power amplifier and matching network 46 which is connected through lines 47 to electrodes of the transducer element 24. Such electrodes may be in the form of thin sheets of foil cemented or deposited on the front and rear faces of the element 24. If the element 24 consists of a plurality of quartz plates or the like arranged in an annular formation, it will be understood that the corresponding electrode elements of all of such plates are connected together.

The modulator or timer 45 is controlled from the synchronizing unit 36 and operates as a switch to periodically apply a signal from the signal generator 44 to the power amplifier and matching network 46 which then applies a high power signal to the modifying beam transducer unit 14. The frequency of operation of the generator 44 is preferably variable. For highest power output, it should preferably be adjusted to the natural resonant frequency of the unit 14. A low level amplifier may preferably be incorporated in the generator 44 to apply an input signal of sufficient amplitude to the power amplifier and matching network 46.

The duration of operation of the timer 45 and the power level of operation are chosen so that temperature changes at the focal region of the modifying beam are of appropriate magnitude to modify the physical parameters enough to permit the examining beam to detect changes at inhomogeneities. By way of example, in detecting boundaries between gray and white matter of the brain, the modifying beam may be energized for an interval of 0.5 second, at an operating frequency of one megacycle. The examining transducer system is preferably brought into operation only after the modifying beam has been applied long enough to so change the inhomogeneities as to permit detection thereof. For example, a signal may be applied from the synchronizing unit 36 to the timer 38 to cause operation of the examining system during the last 0.1 second of a 0.5 second modifying beam pulse.

The operating values such as the frequencies of the modifying and examining beams, the duration of the examining and modifying pulses, and the power level of the modifying beam are dependent of course upon the nature of the material being investigated and the type of inhomogeneity to be detected. In general, the optimum duration of the modifying pulse decreases with an increase in conductivity of the material being investigated, so that a relatively short pulse may be desired in examining metals for stress concentrations for example.

The required intensity of the modifying beam is dependent upon the nature of the inhomogeneity, higher intensities being required to detect an inhomogeneity differing only slightly from the surrounding medium. For example, in detecting transition zones between different states of a stainless steel alloy, an intensity of as high as 100,000 watts per square centimeter or higher at the modifying beam focal region may be employed. This would require a gain of 100 in the focusing system with 1000 watts per square centimeter intensity at a transducer face of 10 square centimeters, a value which can be readily obtained.

In general, the frequency of the modifying beam and the frequency of the examining beam are determined respectively by the absorption characteristics and the size of inhomogeneities to be detected, the frequency of the examining transducer being increased to permit detection of smaller size inhomogeneities.

It will be appreciated that the inhomogeneity may be detected by means other than a pulse-echo system such as through a through-transmission system, wherein the existence of an inhomogeneity is detected by detecting the reduction in intensity of acoustic energy passing through the region thereof. Although highly desirable in most cases, it is not always essential that the beam be focused nor is it always necessary that the examining and modifying beams be parallel. For example, the examining beam may in some cases be at right angles to the modifying beam.

It will be understood that other modifications and variations may be effected without departing from the spirit and scope of the novel concepts of the present invention.

I claim as my invention:

1. In a system for detecting inhomogeneities in a specimen structure, means for transmitting acoustic energy into the structure with sufficient intensity to induce temperature gradients in inhomogeneities therein to produce in turn detectable acoustical velocity gradients in the inhomogeneities, and means for transmitting an examining beam into the inhomogeneities of the structure and for detecting the examining beam emanating from the structure which has been modified by said induced acoustical velocity gradients.

2. In a system for detecting inhomogeneities in a specimen structure, means for producing a focused modifying beam having a focal region within the specimen structure and having an intensity sufficient to induce temperature gradients in inhomogeneities in said focal region to produce in turn detectable acoustical velocity gradients in the inhomogeneities, and means for producing a focused examining beam having a focal region at least partially overlapping said focal region of said modifying beam and for detecting the examining beam emanating from the structure which has been modified by said induced acoustical velocity gradients.

3. In a system for detecting inhomogeneities in a specimen structure, means for transmitting acoustic energy into the structure with sufficient intensity to induce temperature gradients in inhomogeneities therein to produce in turn detectable acoustical velocity gradients in the inhomogeneities, and means for transmitting an examining beam into the inhomogeneities of the structure including means for detecting the examining beam emanating from the structure which has been modified by said induced acoustical velocity gradients.

4. In a system for detecting inhomogeneities in a specimen structure, means for generating a beam of acoustic energy, means for transmitting and focusing said beam into a restricted region of the specimen structure to induce temperature gradients in an inhomogeneity therein to produce in turn detectable acoustical velocity gradients in the inhomogeneity, and means for transmitting an examining beam into the inhomogeneities of the structure and for detecting the examining beam emanating from the structure which has been modified by said induced acoustical velocity gradients.

5. In a system for detecting inhomogeneities in a specimen structure, means for transmitting acoustic energy into the structure with sufficient intensity to induce temperature gradients in inhomogeneities therein to produce in turn detectable acoustical velocity gradients in the inhomogeneities, and pulse-echo means for transmitting an examining beam into the inhomogeneities of the structure and for acoustically detecting the examining beam emanating from the structure which has been modified by said induced acoustical velocity gradients.

6. In a method for detecting inhomogeneities in a specimen structure, the steps of transmitting acoustical energy into the structure with sufficient intensity to induce temperature gradients in an inhomogeneity therein to produce in turn detectable acoustical velocity gradients in the inhomogeneity, transmitting an examining beam into the inhomogeneity of the structure and acoustically detecting the examining beam emanating from the structure which has been modified by the induced acoustical velocity gradients.

7. In a system for detecting inhomogeneities in a specimen structure, a first transducer arranged to produce an acoustic beam impinged on a region within the specimen structure, generating means for applying power to said first transducer at a power level sufficient to induce temperature gradients in inhomogeneities in said region to produce in turn detectable acoustical velocity gradients in the inhomogeneities, examining means including a second transducer for transmitting an examining beam into the inhomogeneities of the region and receiving the examining beam emanating from the region which has been modified by said induced acoustical velocity gradients for detecting said gradients, means for activating said generating means for a certain time interval, and means for activating said examining means during a final portion of said time interval.

8. In a system for detecting inhomogeneities in a specimen structure, a first transducer arranged to produce an acoustic beam impinged on a region within the specimen structure, generator means for applying power to said first transducer at a power level sufficient to induce temperature gradients in inhomogeneities in said region to produce in turn detectable acoustical velocity gradients in the inhomogeneities, examining means including a second transducer for transmitting an examining beam into the inhomogeneities and receiving the examining beam emanating from the region for detecting said gradients, and means for conjointly moving said transducers to scan a portion of the specimen structure.

9. In a system for detecting inhomogeneities in a specimen structure, a first transducer arranged to produce an acoustic beam impinged on a region within the specimen structure, generator means for applying power to said first transducer at a power level sufficient to induce temperature gradients in inhomogeneities in said region to produce in turn detectable acoustical velocity gradients in the inhomogeneities, examining means including a second transducer for transmitting an examining beam into the inhomogeneities and receiving the examining beam emanating from the region for detecting said gradients, a synchronizing unit, means controlled by said synchronizing unit for conjointly moving said transducers to scan a portion of the specimen structure, and means controlled by said synchronizing unit for activating said generator means and after a certain time interval activating said examining means.

10. In a system for detecting inhomogeneities in a specimen structure, a first transducer arranged to produce a first focused acoustic beam having a focal region within the specimen structure, a second transducer arranged to produce a second focused acoustic beam of annular form surrounding said first beam and having a focal region overlapping with said focal region of said first beam, means for applying sufficient power to one of said transducers to induce temperature gradients in inhomogeneities in said overlapping focal regions to produce in turn detectable acoustical velocity gradients in the inhomogeneities, means connected to the other of said transducers for receiving the focused acoustic beam transmitted by said other transducer emanating from the structure, which received beam has been modified by the induced velocity gradients, and means connected to the other of said transducers for indicating said induced acoustical velocity gradients.

11. In a system for detecting inhomogeneities in a specimen structure, a first transducer arranged to produce a first focused acoustic beam having a focal region within the specimen structure and arranged to receive a portion of the first focused acoustic beam emanating from the structure, a second transducer arranged to produce a second focused acoustic beam of annular form surrounding said first beam and having a focal region overlapping with said focal region of said first beam, means for applying sufficient power to said second transducer to induce temperature gradients in inhomogeneities in said focal regions to produce in turn detectable acoustical velocity gradients in the inhomogeneities, and means connected to said first transducer for indicating said induced acoustical velocity gradients.

12. In a system for detecting inhomogeneities in a specimen structure, a first transducer arranged to produce a first focused acoustic beam having a focal region within the specimen structure, a second transducer arranged to produce a second focused acoustic beam of annular form surrounding said first beam and having a focal region overlapping with said focal region of said first beam, means for applying sufficient power to one of said transducers to induce temperature gradients in inhomogeneities in said overlapping focal regions to produce in turn detectable acoustical velocity gradients in the inhomogeneities, support means carrying both of said transducers, and means for moving said support means to scan a portion of the specimen structure.

13. In a system for detecting inhomogeneities in a specimen structure, a first transducer arranged to transmit a first acoustic beam into a region within the specimen structure, first generator means for applying power to said first transducer at a power level sufficient to induce temperature gradients in inhomogeneities in said region to produce in turn detectable acoustical velocity gradients in the inhomogeneities, a second transducer arranged to transmit a second acoustic beam into said region and to receive echoes from inhomogeneities within said region, second generator means for periodically energizing said second transducer, and means including an oscillograph presentation system for indicating echoes from inhomogeneities.

14. In a system for detecting inhomogeneities in a specimen structure, a first transducer arranged to transmit a first acoustic beam into a region within the specimen structure, first generator means for applying power to said first transducer at a power level sufficient to induce temperature gradients in inhomogeneities in said region to produce in turn detectable acoustical velocity gradients in the inhomogeneities, a second transducer arranged to transmit a second acoustic beam into said region and to receive echoes from inhomogeneities within said region, second generator means for periodically energizing said second transducer, and a synchronizing unit for first energizing said first generator means and for subsequently energizing said second generator means after a certain delayed time interval.

15. In a system for detecting inhomogeneities in a specimen structure, a first transducer having a vibratory front face, a focusing plate having a rear face in spaced relation to said front face of said transducer, a couplant between said front face of said transducer and said rear face of said plate, said plate having a contoured front face arranged to produce a focused acoustic beam having a focal region within the specimen structure, generator means for applying power to said first transducer at a power level sufficient to induce temperature gradients in inhomogeneities in said region to produce in turn detectable acoustical velocity gradients in the inhomogeneities, and acoustical means for transmitting an examining beam into the focal region of the focused acoustic beam and for detecting the examining beam emanating from the specimen structure which has been modified by said induced acoustical velocity gradients.

16. In a system for detecting inhomogeneities in a specimen structure, a first transducer having a vibratory front face, a focusing plate having a rear face in spaced relation to said front face of said transducer, a couplant between said front face of said transducer and said rear face of said plate, said plate having a contoured front face arranged to produce a focused acoustic beam having a focal region within the specimen structure, generator means for applying power to said first transducer at a power level sufficient to induce temperature gradients in inhomogeneities in said region to produce in turn detectable acoustical velocity gradients in the inhomogeneities, and acoustical means for transmitting an examining beam into the focal region of the acoustic beam and for detecting the examining beam emanating from the specimen structure which has been modified by said induced acoustical velocity gradients, said focusing plate and said couplant having thicknesses on the order of an odd number of quarter wavelengths, the said focusing plate having a high characteristic impedance while said couplant has a low characteristic impedance.

References Cited by the Examiner

UNITED STATES PATENTS

| | | | |
|---|---|---|---|
| 2,527,986 | 10/1950 | Carlin | 73—67.8 |
| 2,763,153 | 9/1956 | Simjian | 73—67.8 |
| 2,770,795 | 11/1956 | Peterson | 73—194 |
| 2,784,325 | 3/1957 | Halliday et al. | 73—67.7 X |
| 3,086,390 | 4/1963 | Brown | 73—67.8 |

OTHER REFERENCES

Page 5.17 Nondestructive Testing Handbook by McMaster, published by Roland Press, 1959.

RICHARD C. QUEISSER, *Primary Examiner.*

ROBERT L. EVANS, *Examiner.*